(12) United States Patent
Shi (10) Patent No.: US 11,378,916 B2
(45) Date of Patent: Jul. 5, 2022

(54) HOLOGRAPHIC DISPLAY METHOD AND HOLOGRAPHIC DISPLAY DEVICE

(71) Applicant: BOE TECHNOLOGY GROUP CO., LTD., Beijing (CN)

(72) Inventor: Bingchuan Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 326 days.

(21) Appl. No.: 16/332,327

(22) PCT Filed: Jul. 25, 2018

(86) PCT No.: PCT/CN2018/097009
§ 371 (c)(1),
(2) Date: Mar. 11, 2019

(87) PCT Pub. No.: WO2019/062306
PCT Pub. Date: Apr. 4, 2019

(65) Prior Publication Data
US 2021/0034012 A1    Feb. 4, 2021

Related U.S. Application Data

(60) Provisional application No. PCT/CN2018/097009, filed on Jul. 25, 2018.

(30) Foreign Application Priority Data

Sep. 29, 2017 (CN) .......................... 20170911873.1

(51) Int. Cl.
*G03H 1/08* (2006.01)
*G03H 1/00* (2006.01)
*G03H 1/22* (2006.01)

(52) U.S. Cl.
CPC .......... *G03H 1/0866* (2013.01); *G03H 1/0005* (2013.01); *G03H 1/0808* (2013.01); *G03H 1/2294* (2013.01)

(58) Field of Classification Search
CPC .. G03H 1/0866; G03H 1/0005; G03H 1/0808; G03H 1/2294; G03H 2226/05;
(Continued)

(56) References Cited

U.S. PATENT DOCUMENTS

| | | | |
|---|---|---|---|
| 2004/0021768 A1 | 2/2004 | Payne et al. | |
| 2006/0055994 A1* | 3/2006 | Schwerdtner | G03H 1/2294 359/15 |

(Continued)

FOREIGN PATENT DOCUMENTS

| | | |
|---|---|---|
| CN | 1711509 A | 12/2005 |
| CN | 101014911 A | 8/2007 |

(Continued)

OTHER PUBLICATIONS

Soobin Kim et al., "Viewing-window extension of holographic display using high-order diffraction," Digital Holography and 3-D Imaging 2017.

(Continued)

*Primary Examiner* — Audrey Y Chang
(74) *Attorney, Agent, or Firm* — McDermott Will & Emery LLP (57) ABSTRACT

Disclosed are a holographic display method and a holographic display device. The holographic display method includes: acquiring an area of Nth diffraction order corresponding to an eye position; according to the area of Nth diffraction order, calculating a holographic complex amplitude distribution corresponding to a window of Nth diffraction order to obtain window hologram information, a function of the holographic complex amplitude distribution (Continued)

being expressed by $C(m,n)=A(m,n)*\exp[-i\varphi(m,n)/N]$; encoding the window hologram information; and according to the encoded window hologram information, loading the encoded window hologram information in the area of Nth diffraction order to display a hologram.

4 Claims, 6 Drawing Sheets

(58) Field of Classification Search
CPC ...... G03H 2001/303; G03H 1/08; G03H 1/12; G03H 1/22
USPC .................................. 359/9, 29, 23
See application file for complete search history.

(56) References Cited

U.S. PATENT DOCUMENTS

| | | | |
|---|---|---|---|
| 2006/0139711 A1* | 6/2006 | Leister | G03H 1/0005 359/9 |
| 2008/0198430 A1 | 8/2008 | Schwerdtner et al. | |
| 2010/0149313 A1 | 6/2010 | Kroll et al. | |
| 2011/0026089 A1 | 2/2011 | Schwerdtner | |
| 2015/0097925 A1 | 4/2015 | Choo et al. | |
| 2016/0255338 A1* | 9/2016 | Song | H04N 13/139 348/47 |

FOREIGN PATENT DOCUMENTS

| | | |
|---|---|---|
| CN | 101088053 A | 12/2007 |
| CN | 101681145 A | 3/2010 |
| WO | 01/95016 A1 | 12/2001 |

OTHER PUBLICATIONS

Office Action issued in corresponding Chinese Patent Application No. 201710911873.1 dated Nov. 7, 2019.
Search Report dated Oct. 23, 2018, which issued in International Patent Application No. PCT/CN2018/097009.

* cited by examiner

HOLOGRAPHIC DISPLAY METHOD AND HOLOGRAPHIC DISPLAY DEVICE

CROSS-REFERENCE TO RELATED APPLICATION

This application is a Section 371 National Stage Application of International Application No. PCT/CN2018/097009, filed on Jul. 25, 2018, entitled "HOLOGRAPHIC DISPLAY METHOD AND HOLOGRAPHIC DISPLAY DEVICE", which claims priority to Chinese Patent Application No. 201710911873.1 filed on Sep. 29, 2017 in the State Intellectual Property Office of China, the whole disclosure of which is incorporated herein by reference.

TECHNICAL FIELD

The present disclosure relates to the field of holographic display technology, and in particular, to a holographic display method and a holographic display device.

BACKGROUND

A holographic display technology is firstly applied in the field of three-dimensional imaging. In recent years, with an insistent demand for three-dimensional display in markets, the holographic display technology has been rapidly developed in display devices and implementation methods. At present, key components of the holographic stereoscopic display system include a coherent light source, a recording medium and a spatial light modulator (abbreviated as SLM). The coherent light source may provide an object light, a reference light and a reconstruction light. The recording medium is capable of recording holographic interference fringes to form a hologram. The spatial light modulator may reconstruction a holographic image to perform display.

SUMMARY

In one aspect, it is provided a holographic display method, including: acquiring an area of $N^{th}$ diffraction order corresponding to an eye position; according to the area of $N^{th}$ diffraction order, calculating a holographic complex amplitude distribution corresponding to a window of $N^{th}$ diffraction order to obtain window hologram information, a function of the holographic complex amplitude distribution being expressed by $C(m,n)=A(m,n)*\exp[-i\varphi(m, n)/N]$; encoding the window hologram information; and according to the encoded window hologram information, loading the encoded window hologram information in the area of $N^{th}$ diffraction order to display a hologram, wherein C is the function of the holographic complex amplitude distribution, A is an amplitude function, i is a phase identifier, $\varphi$ is a phase function, m is a sequence number of row where a pixel is located and n is a sequence number of column where the pixel is located, and $N=\pm j$, where j is an integer other than 0 and multiples of 3.

For example, when the area of $N^{th}$ diffraction order corresponding to the eye position is an area of $1^{st}$ diffraction order, holographic complex amplitudes corresponding to a window of $1^{st}$ diffraction order are directly calculated to obtain the window hologram information.

For example, when the area of $N^{th}$ diffraction order corresponding to the eye position is an area of $-1^{st}$ diffraction order, holographic complex amplitudes corresponding to a window of $1^{st}$ diffraction order are conjugated to obtain the window hologram information.

For example, when the area of $N^{th}$ diffraction order corresponding to the eye position is an area of $2^{nd}$ diffraction order, holographic complex amplitudes corresponding to a window of $1^{st}$ diffraction order are calculated by halving phases of the holographic complex amplitudes to obtain the window hologram information.

For example, when the area of $N^{th}$ diffraction order corresponding to the eye position is an area of $-2^{nd}$ diffraction order, holographic complex amplitudes corresponding to a window of $1^{st}$ diffraction order are conjugated and calculated by halving phases of the holographic complex amplitudes to obtain the window hologram information.

Optionally, acquiring the area of $N^{th}$ diffraction order corresponding to the eye position includes: collecting an image of human eye, and determining the eye position according to the image of human eye.

Optionally, the diffraction order includes a diffraction order formed by a periodical arrangement of modulation units in a spatial light modulator, each of the modulation units including at least three independently controllable pixels which are adjacent in the same row or in the same column and are of amplitude modulation type.

Optionally, the window hologram information is encoded by Burckhardt encoding mode.

In another aspect, it is provided a holographic display device including a spatial light modulator, an eye position acquiring unit and a controller, wherein the eye position acquiring unit is configured to acquire an eye position and transmit the eye position to the controller; the controller includes a memory storing instructions and at least one processor, when the instructions are executed by the at least one processor, the at least one processor being configured to: according to an area of $N^{th}$ diffraction order corresponding to the eye position, calculate a holographic complex amplitude distribution corresponding to a window of $N^{th}$ diffraction order to obtain window hologram information, a function of the holographic complex amplitude distribution being expressed by $C(m,n)=A(m,n)*\exp[-i\varphi(m,n)/N]$; and encode the window hologram information, and transmit the encoded window hologram information to the spatial light modulator; and the spatial light modulator is configured to receive the encoded window hologram information, load the encoded window hologram information in the area of $N^{th}$ diffraction order to display a hologram, wherein C is the function of the holographic complex amplitude distribution, A is an amplitude function, i is a phase identifier, $\varphi$ is a phase function, m is a sequence number of row where a pixel is located and n is a sequence number of column where the pixel is located, and $N=\pm j$, where j is an integer other than 0 and multiples of 3.

For example, the at least one processor is configured to calculate holographic complex amplitudes corresponding to a window of $1^{st}$ diffraction order directly to obtain the window hologram information when the area of $N^{th}$ diffraction order corresponding to the eye position is an area of $1^{st}$ diffraction order.

For example, the at least one processor is configured to conjugate holographic complex amplitudes corresponding to a window of $1^{st}$ diffraction order to obtain the window hologram information when the area of $N^{th}$ diffraction order corresponding to the eye position is an area of $-1^{st}$ diffraction order.

For example, the at least one processor is configured to halve phases of holographic complex amplitudes corresponding to a window of $1^{st}$ diffraction order to obtain the window hologram information when the area of $N^{th}$ diffraction order corresponding to the eye position is an area of $2^{nd}$ diffraction order.

For example, the at least one processor is configured to conjugate holographic complex amplitudes corresponding to a window of $1^{st}$ diffraction order and halve phases of the holographic complex amplitudes to obtain the window hologram information when the area of $N^{th}$ diffraction order corresponding to the eye position is an area of $-2^{nd}$ diffraction order.

Optionally, the eye position acquiring unit is an eyeball tracking device or an eye gaze tracking device adjacent to the spatial light modulator, the eyeball tracking device or the eye gaze tracking device being configured to collect an image of human eye and determine the eye position according to the image of human eye.

Optionally, modulation units are periodically arranged in the spatial light modulator to form diffraction orders, each of the modulation units including at least three independently controllable pixels which are adjacent in the same row or in the same column and are of amplitude modulation type.

Optionally, the spatial light modulator includes a plurality of rows of pixels and a plurality of columns of pixels, and the modulation units are periodically arranged in both rows and columns, respectively.

Optionally, the at least one processor is configured to encode the window hologram information by using Burckhardt encoding mode.

In a further aspect, it is provided a holographic display device including a spatial light modulator, an eye position acquiring unit, a calculating unit and a processing unit, wherein the eye position acquiring unit is configured to acquire an eye position and transmit the eye position to the calculating unit; the calculating unit is configured to, according to an area of $N^{th}$ diffraction order corresponding to the eye position, calculate a holographic complex amplitude distribution corresponding to a window of $N^{th}$ diffraction order to obtain window hologram information, a function of the holographic complex amplitude distribution being expressed by $C(m,n)=A(m,n)*\exp[-i\varphi(m,n)/N]$; the processing unit is connected to the calculating unit and configured to encode the window hologram information and transmit the encoded window hologram information to the spatial light modulator; and the spatial light modulator is configured to receive the encoded window hologram information, load the encoded window hologram information in the area of $N^{th}$ diffraction order to display a hologram, wherein C is the function of the holographic complex amplitude distribution, A is an amplitude function, i is a phase identifier, $\varphi$ is a phase function, m is a sequence number of row where a pixel is located and n is a sequence number of column where the pixel is located, and $N=\pm j$, where j is an integer other than 0 and multiples of 3.

DETAILED DESCRIPTION OF EMBODIMENTS

To enable those skilled in the art to better understand technical solutions of the present disclosure, a holographic display method and a holographic display device according to embodiments of the present disclosure will be further described in detail below with reference to accompanying drawings and specific embodiments.

In a case where a spatial bandwidth product of a modulator is constant, an exit pupil size of a holographic display system and a display viewing angle thereof are mutually constrained, that is, increasing one of the exit pupil size and the display viewing angle may cause the other one to decrease. In practical applications, an optical system is employed to constrain the exit pupil size within a small area (i.e., a window) to perform a holographic display, in order to ensure the viewing angle of a visual observation.

Figure 1A:
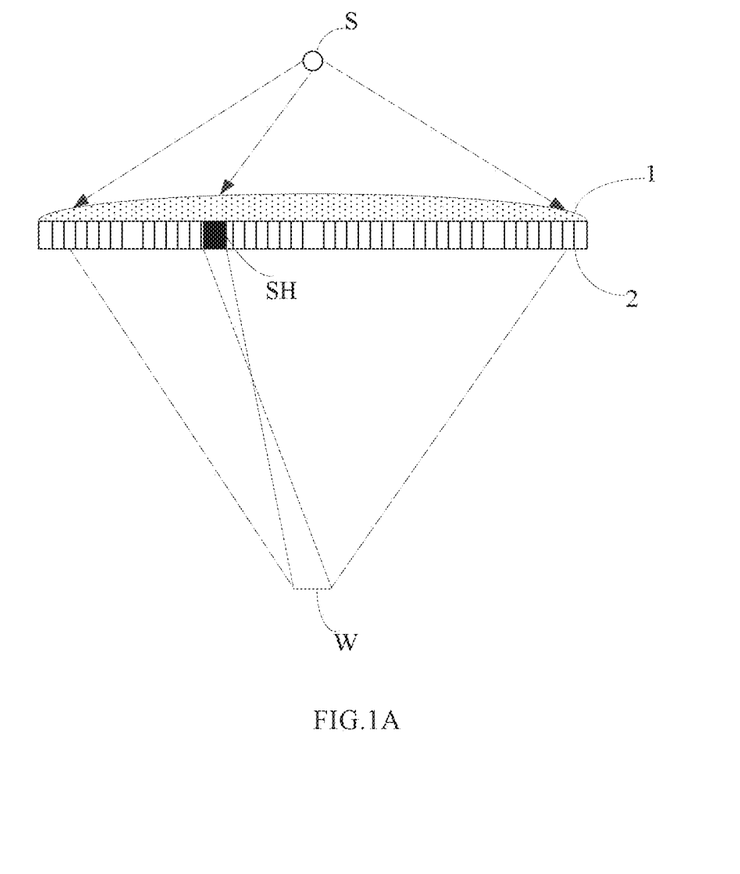
FIG. 1A is a schematic view showing a principle of window holography.

As shown in FIG. 1A, while a wavefront which is the same as a wavefront of a real object at a human eye is generated, a virtual observation window (i.e., window W) for a three-dimensional (i.e., 3D) object is provided. Reconstruction light from a light source S passes through a lens 1 and illuminates a spatial light modulator (i.e., SLM) 2 that has encoded a point of a three-dimensional scene. A wavefront information of an object point is encoded by the spatial light modulator 2, and coherent light reconstructs the object point, so that the object point may be observed from the window W which is larger than the human eye. The window W is located on the Fourier plane of a hologram. The size of the window is related to the size of a diffraction order. Typically, the window covers at least a diameter of a pupil of the human eye. A holographic information of each point on the three-dimensional object is encoded in a finite area SH of the spatial light modulator 2. The information of each point on the three-dimensional object is correspondingly stored in a certain part of the hologram, which may be called as a partial hologram or a sub-hologram.

In order to ensure that all light beams emitted from the modulator may be observed by the eye, a traditional holographic technique requires a large spatial frequency (i.e., a resolution per unit area) of the modulator to generate a large diffraction angle so as to ensure that the light beams emitted from different positions of the modulator have an overlapped area which may be observed by the eye at the same time. A window holography utilizing the partial hologram or the sub-hologram is typically characterized in that all effective modulated light beams are converged into the window, thereby reducing a requirement on the spatial frequency of the modulator.

Figure 1B:
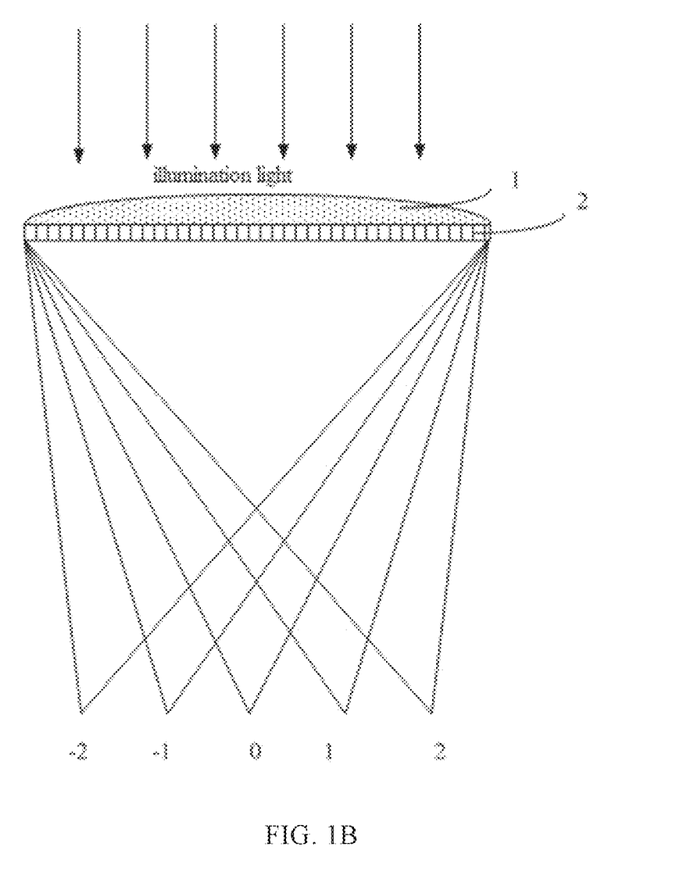
FIG. 1B is a schematic view showing a holographic diffraction order distribution of a spatial light modulator based on amplitude modulation.

The inventor has found that the window holographic display causes a limited viewing angle mainly because the spatial light modulator exhibits a periodic variation in transmittance. When the reconstruction light is incident on the spatial light modulator, transmitted light includes diffracted light of $-3^{rd}$ diffraction order, $-2^{nd}$ diffraction order, $-1^{st}$ diffraction order, $0^{th}$ diffraction order, $1^{st}$ diffraction order, $2^{nd}$ diffraction order, $3^{rd}$ diffraction order, etc. When the diffraction order is higher than 1 or $-1$, the diffracted light may be called as diffracted light of high diffraction orders. Because of the diffracted light of high diffraction orders, the viewing angle of a reconstruction object wave is limited. As shown in FIG. 1B, a holographic diffraction order distribution of a spatial light modulator based on amplitude modulation is shown. The lens 1 converges illumination light, the spatial light modulator 2 loads the encoded hologram information, and the window holography causes the modulated light from different positions of the spatial light modulator 2 to converge toward a common point (i.e., window) for observation by the eye, without being observed outside the window.

In an embodiment of the present disclosure, when an observer's eye falls within an area around the window W, complex amplitudes of the hologram are calculated, adjusted and then encoded and loaded again, so that all holographic images may be observed to achieve the purpose of expanding the window area.

Figure 2:
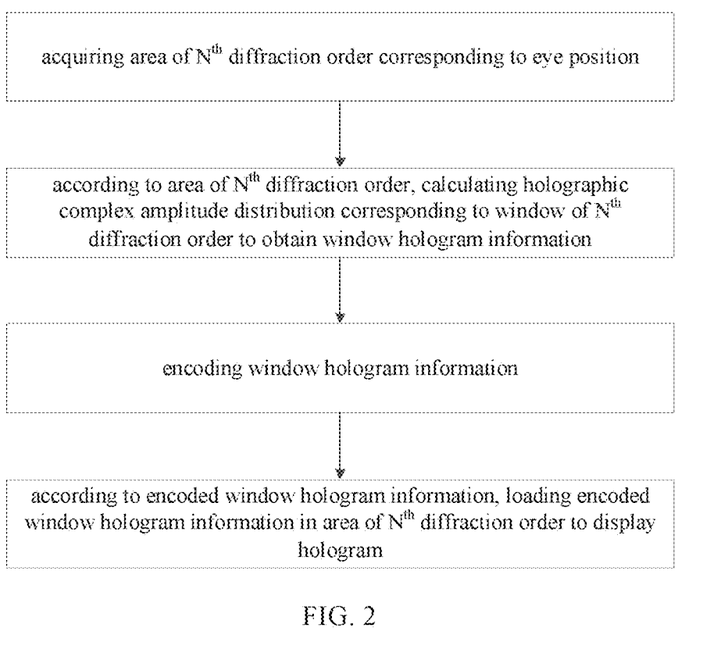
FIG. 2 is a flow chart of a holographic display method according to an embodiment of the present disclosure.

According to an embodiment of the present disclosure, a holographic display method is provided. The holographic display method may expand the window by adjusting data based on a phase relationship between various diffraction orders. As shown in FIG. 2, the holographic display method may include the following steps.

In step S1, an area of $N^{th}$ diffraction order corresponding to an eye position is acquired.

In this step, an image of human eye is acquired, and the eye position is determined based on the image of human eye, so that the area of $N^{th}$ diffraction order corresponding to the eye position is acquired.

In step S2, a holographic complex amplitude distribution corresponding to an $N^{th}$ diffraction window is calculated according to the area of $N^{th}$ diffraction order corresponding to the eye position, so as to obtain window hologram information.

Figure 3A:
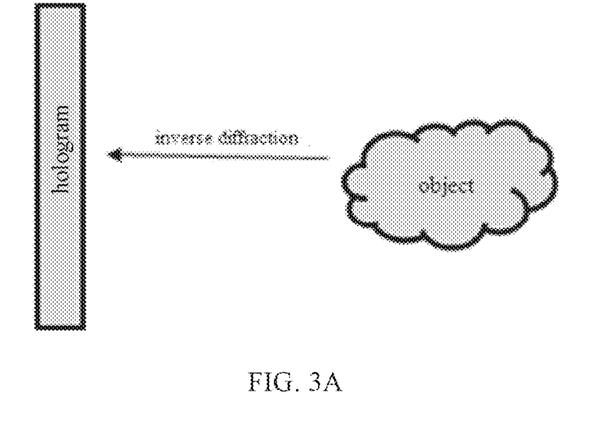
FIG. 3A and FIG. 3B are schematic views showing two stages for forming a holographic image of an object, respectively.
Figure 3B:
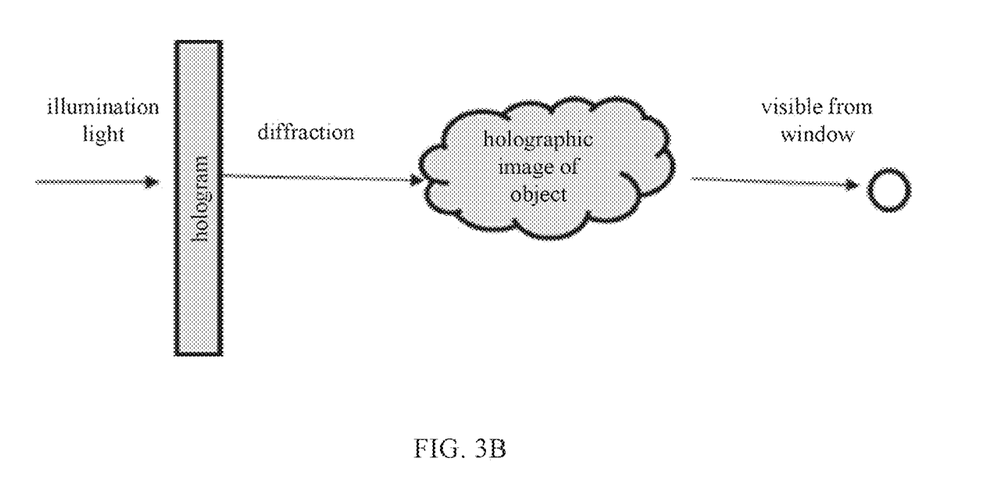

As shown in FIG. 3A and FIG. 3B, a process of obtaining the holographic image may include: an establishment of an object point model (i.e., an object which may be a two-dimensional photograph or a three-dimensional diagram) →diffraction calculation→complex amplitude distribution (of hologram)→encoding (electronic spatial information which is loadable by the spatial light modulator, including BMP images or other images)→loading to the spatial light modulator→observing the holographic image from the window position.

The holographic image is located in a cone formed by lines connecting $1^{st}$ light spot (point) and the spatial light modulator plane (quadrilateral). Here, a position of the light spot is a position of the window. When the spatial light modulator does not load the hologram, the position of the window is a small light point. When the spatial light modulator loads the hologram, light of the holographic image propagates to form a light spot at the window position. The hologram is obtained by encoding complex amplitudes on a surface of the spatial light modulator. In the holographic display method according to embodiments of the present disclosure, all adjustments to values of the complex amplitudes are performed with regard to complex amplitudes corresponding to the hologram, rather than complex amplitudes of light wave after the hologram is diffracted.

In the display method according to the embodiment, a function of the holographic complex amplitude distribution by the diffraction calculation may be expressed as follows:

$$C(m,n)=A(m,n)*\exp[-i\varphi(m,n)/N],$$

where C is the function of the holographic complex amplitude distribution, A is an amplitude function, i is a phase identifier (the function of the holographic complex amplitude distribution is a complex variable function, where i is an imaginary unit), φ is a phase function, m is a sequence number of row where a pixel is located and n is a sequence number of column where the pixel is located, and N=±j, where j is an integer other than 0 and multiples of 3.

In general, the function of the holographic complex amplitude distribution by the diffraction calculation corresponding to Burckhardt encoding may be expressed as follows:

$$C(m,n)=A(m,n)*\exp[-i\varphi(m,n)].$$

Figure 4A:
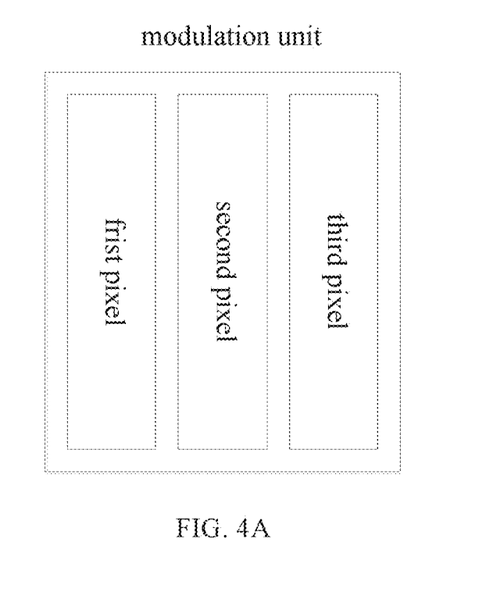
FIG. 4A is a schematic view of a modulation unit.
Figure 4B:
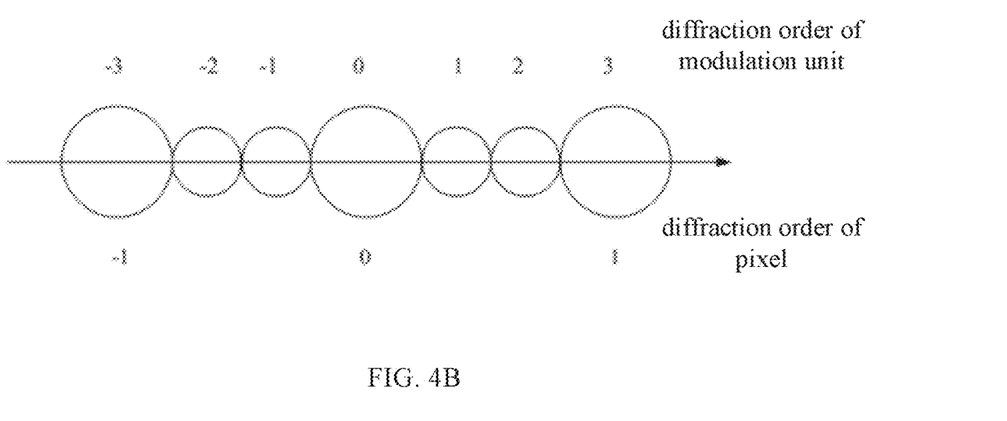
FIG. 4B is a schematic view showing a one-dimensional window distribution of diffraction orders of a hologram.

In the holographic display method according to the embodiments of the present disclosure, the holographic complex amplitudes may be corrected for the window of $N^{th}$ diffraction order. The different diffraction orders include diffraction orders formed by a periodic arrangement of modulation units in the spatial light modulator. One modulation unit consists of at least three independently controllable pixels which are adjacent in the same row or in the same column and are of amplitude modulation type. In the hologram using Burckhardt encoding, referring to FIG. 4A, every three independently controllable pixels (for example, first pixel, second pixel, third pixel) constitute a complex amplitude modulation unit. A diffraction angle and a window size both depend on a distance d between centers of adjacent modulation units. It should not be overlooked that a distance between centers of any adjacent independent pixels is equal to d/3, so that they also form a periodic arrangement, which also produces a diffraction effect. Therefore, the diffraction orders of the light spots may be shown in FIG. 4B. Diffraction orders of pixels are independent of encoding modes and are determined by pixel size. Diffraction orders of the modulation units are related to the encoding mode, specifically, they depend on number of pixels occupied by the encoding. In the holographic display method according to the embodiments of the present disclosure, the diffraction orders match with the spatial light modulator, specifically, the complex amplitude distribution of the hologram is adjusted so that the holographic image is presented in a plurality of areas of diffraction orders, thereby expanding the visible range of the window hologram.

In step S3, the window hologram information is encoded.

In the window holographic technique based on a transmissive spatial light modulator, illumination light (usually with a monochromatic wavelength, which may be a laser or a narrowband LED) illuminates the spatial light modulator, and holographic codes are loaded to form the holographic image. In the holographic encoding, the Burckhardt encoding mode may be adopted. In the Burckhardt encoding mode, at least three independently controllable pixels (not required to be color pixels) in the spatial light modulator are used to form an encoding unit to encode a complex amplitude. The size of the window of the holographic display depends on the spatial size d occupied by the encoding unit. Generally, when a distance between an observation position and the window is z and a wavelength of the holographic illumination light is λ, a diameter D of the window may be calculated by using a formula "D=λz/d". The size of the window is determined by hardware parameters and is difficult to be changed.

According to step S2, a distribution of wavefront phase values may be obtained by the diffraction calculation. The Burckhardt encoding aims to optically modulate the distribution of wavefront phase values so as to create light wave phases which correspond to the numerical phases in a direction of the 1$^{st}$ diffraction order. The Burckhardt encoding follows the diffraction calculation so that they constitute two stages of the process. The diffraction calculation is firstly performed, and then the encoding is performed, and the encoding mode is adapted to the calculated values.

In current window holographic display, the window is a window formed by the modulation unit of 1$^{st}$ diffraction order, which occupies only a small portion of all diffracted light. In the holographic display method according to the embodiments of the present disclosure, according to the area of N$^{th}$ diffraction order corresponding to the eye position, the window hologram information corresponding to the window of N$^{th}$ diffraction order is encoded.

Specifically, when the area of N$^{th}$ diffraction order corresponding to the eye position is the area of 1$^{st}$ diffraction order, the holographic complex amplitudes corresponding to the window of 1$^{st}$ diffraction order is calculated directly to obtain the window hologram information, and the corresponding window hologram information is encoded and loaded.

When the area of N$^{th}$ diffraction order corresponding to the eye position is the area of −1$^{st}$ diffraction order, the holographic complex amplitudes corresponding to the window of 1$^{st}$ diffraction order are conjugated to obtain the window hologram information, and the corresponding window hologram information is encoded and loaded.

When the area of N$^{th}$ diffraction order corresponding to the eye position is the area of 2$^{nd}$ diffraction order, the holographic complex amplitudes corresponding to the window of 1$^{st}$ diffraction order are calculated by halving phases of the holographic complex amplitudes to obtain the window hologram information, and the corresponding window hologram information is encoded and loaded.

When the area of N$^{th}$ diffraction order corresponding to the eye position is the area of −2$^{nd}$ diffraction order, the holographic complex amplitudes corresponding to the window of 1$^{st}$ diffraction order are conjugated and calculated by halving phases of the holographic complex amplitudes to obtain the window hologram information, and the corresponding window hologram information is encoded and loaded.

In step S4, the encoded window hologram information is loaded and displayed in the area of N$^{th}$ diffraction order.

In this step, the holographic image may be observed from the window by loading the encoded window hologram information.

On the basis of the step S3, the holographic image is presented in the area of 1$^{st}$ diffraction order according to the encoded window hologram information in the area of 1$^{st}$ diffraction order; the holographic image is presented in the area of −1$^{st}$ diffraction order according to the encoded window hologram information in the area of −1$^{st}$ diffraction order; the holographic image is presented in the area of 2$^{nd}$ diffraction order according to the encoded window hologram information in the area of 2$^{nd}$ diffraction order; and the holographic image is presented in the area of −2$^{nd}$ diffraction order according to the encoded window hologram information in the area of −2$^{nd}$ diffraction order.

Typically, the window formed by the modulation unit of 0$^{th}$ diffraction order may not be utilized since it is of no modulation amount. Moreover, the 3$^{rd}$ diffraction order of the modulation unit is overlapped with the 1$^{st}$ diffraction order of the pixel so that it may not be observed. As a result, N=±j, where j is an integer other than 0 and multiples of 3. In addition, since the diffracted light is already weak as for the ±3$^{rd}$ diffraction orders and higher diffraction orders of the modulation unit, it is actually preferable that N=±1, ±2. As for the ±3$^{rd}$ diffraction orders and higher diffraction orders, they have small effect on forming the holographic image, they will not be described in more details here.

In the holographic display method according to the embodiments of the present disclosure, the window hologram information is encoded by the Burckhardt encoding mode. The encoding mode of the window hologram information matches with the spatial light modulator, and the holographic image may be presented on a plurality of diffraction orders by adjusting the complex amplitude distribution of the hologram, thereby expanding the visible range of the window hologram.

In the holographic display method according to the embodiments of the present disclosure, the complex amplitudes of the hologram may be adjusted according to the position of the observer's eye, so that the holographic image may be presented on a plurality of diffraction orders, thereby expanding the visible range of the window hologram.

Corresponding to the display method according to the above embodiments, an embodiment of the present disclosure further provides a holographic display device. In the holographic display device, the holographic image may be presented in a plurality of areas of diffraction orders by adjusting the complex amplitude distribution of the hologram, thereby expanding the visible range of the window hologram.

Figure 5:
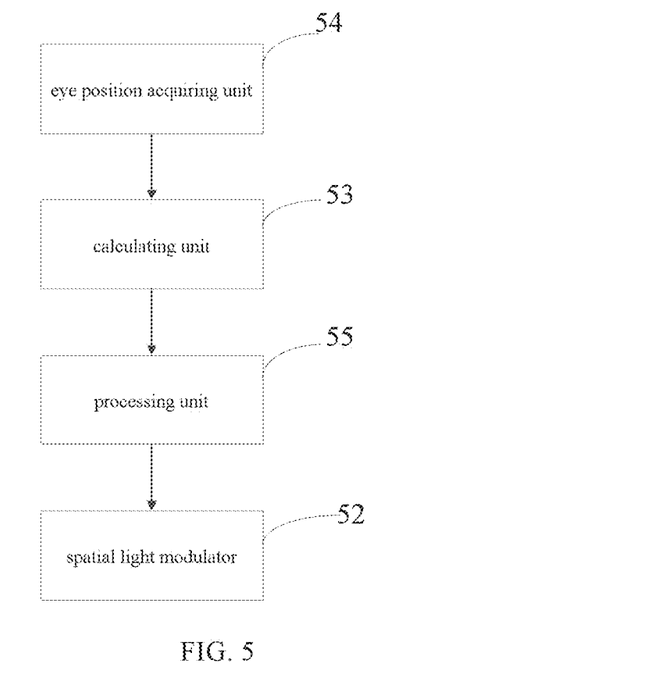
FIG. 5 is a schematic structural view of a holographic display device according to an embodiment of the present disclosure.

As shown in FIG. 5, the holographic display device includes a spatial light modulator 52, and further includes a calculating unit 53, an eye position acquiring unit 54, and a processing unit 55.

The eye position acquiring unit 54 is configured to acquire an eye position and transmit the eye position to the calculating unit 53.

The calculating unit 53 is configured to calculate a holographic complex amplitude distribution corresponding to a window of N$^{th}$ diffraction order according to an area of N$^{th}$ diffraction order corresponding to the eye position, so as to obtain window hologram information, wherein a function of the holographic complex amplitude distribution may be expressed by $C(m,n)=A(m,n)*\exp[-i\varphi(m,n)/N]$.

The processing unit 55 is connected to the calculating unit 53, and is configured to encode the window hologram information and transmit the encoded window hologram information to the spatial light modulator 52.

The spatial light modulator 52 is configured to receive the encoded window hologram information, load and display the window hologram information in the area of N$^{th}$ diffraction order.

In the context, C is the function of the holographic complex amplitude distribution, A is the amplitude function, i is a phase identifier (the function of the holographic complex amplitude distribution is a complex variable function, where i is an imaginary unit), $\varphi$ is a phase function, m is a sequence number of row where a pixel is located and n is a sequence number of column where the pixel is located, and N=±j, where j is an integer other than 0 and multiples of 3.

Specifically, when the area of N$^{th}$ diffraction order corresponding to the eye position is the area of 1$^{st}$ diffraction order, the window hologram information is calculated directly based on the holographic complex amplitudes corresponding to the window of 1$^{st}$ diffraction order, and the corresponding window hologram information is encoded and loaded.

When the area of N$^{th}$ diffraction order corresponding to the eye position is the area of −1$^{st}$ diffraction order, the holographic complex amplitudes corresponding to the window of $1^{st}$ diffraction order are conjugated to obtain the window hologram information, and the corresponding window hologram information is encoded and loaded. In other words, in the $-1^{st}$ diffraction order of the modulation unit, phase modulation amount of each modulation unit in the hologram has a conjugate relationship with phase modulation amount in the $1^{st}$ diffraction order. When the observer's eye is located in the area of $-1^{st}$ diffraction order of the modulation unit, the holographic complex amplitudes are conjugated to obtain the window hologram information, and the corresponding window hologram information is encoded and loaded, so that a normal holographic image may be viewed in this area.

When the area of $N^{th}$ diffraction order corresponding to the eye position is the area of $2^{nd}$ diffraction order, the holographic complex amplitudes corresponding to the window of $1^{st}$ diffraction order are calculated by halving phases of the holographic complex amplitudes to obtain the window hologram information, and the corresponding window hologram information is encoded and loaded. In other words, in the $2^{nd}$ diffraction order of the modulation unit, phase modulation amount of each modulation unit in the hologram is double of phase modulation amount in the $1^{st}$ diffraction order. When the observer's eye is located in the area of $2^{nd}$ diffraction order of the modulation unit, the holographic complex amplitudes are calculated by halving phases of the holographic complex amplitudes to obtain the window hologram information, and the corresponding window hologram information is encoded and loaded, so that a normal holographic image may be viewed in this area.

When the area of $N^{th}$ diffraction order corresponding to the eye position is the area of $-2^{nd}$ diffraction order, the holographic complex amplitudes corresponding to the window of $1^{st}$ diffraction order are conjugated and then calculated by halving phases of the holographic complex amplitudes to obtain the window hologram information, and the corresponding window hologram information is encoded and loaded. In other words, in the $-2^{nd}$ diffraction order of the modulation unit, phase modulation amount of each modulation unit in the hologram has a conjugate relationship with phase modulation amount in the $2^{nd}$ diffraction order. When the observer's eye is located in the area of $-2^{nd}$ diffraction order of the modulation unit, the holographic complex amplitudes are conjugated and then calculated by halving phases of the holographic complex amplitudes to obtain the window hologram information, and the corresponding window hologram information is encoded and loaded, so that a normal holographic image may be viewed in this area.

It will be appreciated that, in the spatial light modulator 2, the holographic image is presented in the area of $1^{st}$ diffraction order according to the encoded window hologram information in the area of $1^{st}$ diffraction order; the holographic image is presented in the area of $-1^{st}$ diffraction order according to the encoded window hologram information in the area of $-1^{st}$ diffraction order; the holographic image is presented in the area of $2^{nd}$ diffraction order according to the encoded window hologram information in the area of $2^{nd}$ diffraction order; and the holographic image is presented in the area of $-2^{nd}$ diffraction order according to the encoded window hologram information in the area of $-2^{nd}$ diffraction order.

According to the above embodiments, the visible range of the window hologram is expanded from the window of $1^{st}$ diffraction order of the modulation unit to the windows of $-2^{nd}$, $-1^{st}$, $1^{st}$, $2^{nd}$ diffraction orders of the modulation unit, so that the visible range of the window hologram is expanded four times.

In the above embodiments, the calculating unit and the processing unit are separately describe, respectively, but those skilled in the art should understand that the calculating unit and the processing unit may be implemented in an integrated circuit manner. For convenience of description, a device that implements the calculating unit and the processing unit in an integrated circuit manner is referred to as a controller.

Figure 6:
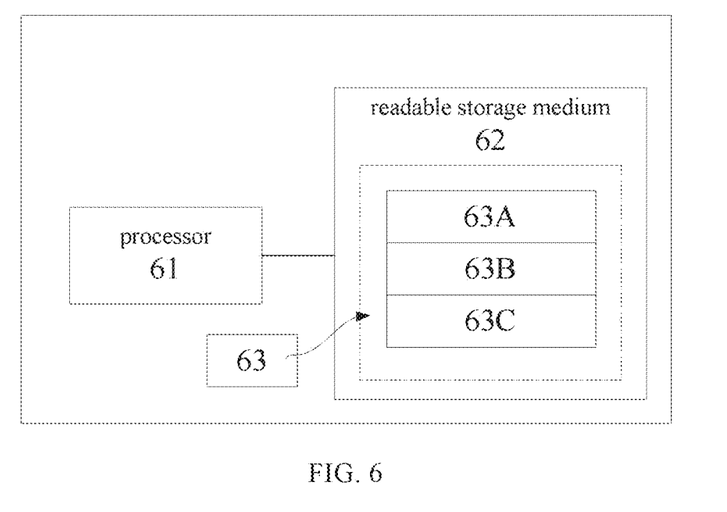
FIG. 6 is a block diagram showing an exemplary hardware arrangement of a controller according to an embodiment of the present disclosure.

For example, FIG. 6 is a block diagram showing an exemplary hardware arrangement of a controller according to an embodiment of the disclosure. The controller may include a processor 61 (e.g., a microprocessor (µP), a digital signal processor (DSP), etc.). The processor 61 may include a single processor or multiple processors for performing various steps performed by the above-described calculating unit and processing unit. Moreover, the controller may also include at least one readable storage medium 62 in the form of a non-volatile or volatile memory, such as an electrically erasable programmable read only memory (EEPROM), flash memory, and/or a hard disk drive. The readable storage medium 62 stores thereon codes or computer readable instructions 63. The codes or computer readable instructions 63 cause the controller to perform the various steps performed by the above-described calculating unit and processing unit and any variations thereof when they are executed by the processor 61. For example, the computer readable instructions 63 may include a plurality of instructions 63A, 63B, 63C for performing the respective steps in the above methods, respectively.

Although code means in the above embodiments in connection with FIG. 6 are implemented as computer program modules that, when executed in processor 61, cause the controller to perform the above-described methods. However, in optional embodiments, at least one of the codes/computer readable instructions may be implemented at least in part as a hardware circuit.

The processor may be a single CPU (Central Processing Unit), but may also include two or more processing units. For example, the processor may include a general purpose microprocessor, an instruction set processor, and/or a related chipset and/or a special purpose microprocessor (e.g., an application specific integrated circuit (ASIC)). The processor may also include an onboard memory for caching purposes. The computer program may be carried by a computer program product connected to the processor. The computer program product may include computer readable medium storing the computer program thereon. For example, the computer program product may be flash memory, random access memory (RAM), read only memory (ROM), EEPROM, and the computer program modules may be distributed to different computer program products in the form of memory within the UE in alternative embodiments.

Optionally, the eye position may be acquired by using an eye tracking device. The eye position acquiring unit 54 may be an eyeball tracking device or an eye gaze tracking device. The eyeball tracking device or the eye gaze tracking device is disposed adjacent to the spatial light modulator 52 for collecting an image of the human eye and determining the eye position according to the image of the human eye, thereby monitoring the window automatically.

The window corresponds to the diffraction order. As the scale of the modulation unit (including at least three pixels) is increased, the diffraction area produced by diffraction is reduced. The window is related to the size of the pixel, but independent of the number of pixels.

In the spatial light modulator 52, at least three independently controllable pixels which are adjacent in the same row or in the same column and are of amplitude modulation type constitute one modulation unit, multiple modulation units are periodically arranged to form the diffraction orders, so that the diffraction windows formed by the modulation units are periodically arranged. Pixels in single row or in single column form a one-dimensional diffraction, and match with the spatial light modulator 52. The holographic image is presented in a plurality of areas of diffraction orders by adjusting the complex amplitude distribution of the hologram to expand the one-dimensional visible range of the window hologram.

In general, the spatial light modulator 52 includes a plurality of rows of pixels and a plurality of columns of pixels, and the diffraction windows are periodically cycled in rows and columns. In fact, the spatial light modulator 52 is a liquid crystal display panel in a two-dimensional array. Based on the above principle, different diffraction orders are formed depending on multiple rows or columns of the spatial light modulator 52, and the diffraction orders of the hologram may be expanded to the two-dimensional direction, thereby expanding the window holographic visible range of the entire two-dimensional visible window.

The coding and decoding of the holographic display correspond to each other. In the holographic display device according to the embodiments of the present disclosure, in the processing unit 55, the window hologram information is encoded by the Burckhardt encoding mode, so that the window hologram information coding mode may match with the spatial light modulator 52. The holographic image is presented in a plurality of areas of diffraction orders by adjusting the complex amplitude distribution of the hologram, thereby expanding the visible range of the window hologram.

In the holographic display device according to the embodiments of the present disclosure, the complex amplitudes of the hologram are adjusted according to the position of the observer's eye, so that they may be distributed in a plurality of areas of diffraction orders to present the holographic image, thereby expanding the visible range of the window hologram.

The display device may be applied to any product or component having display function, and may be applied to various fields such as public display and illusory display.

It is to be understood that the above embodiments are merely exemplary embodiments employed to explain the principles of the present disclosure, but the present disclosure is not limited thereto. Various modifications and improvements may be made by those skilled in the art without departing from the spirit and scope of the disclosure, and these modifications and improvements are also considered to fall within the scope of the disclosure.

What is claimed is:

1. A holographic display method, comprising:
   determining a plurality of areas of diffraction orders of a spatial light modulator, wherein the spatial light modulator comprises a plurality of modulation units that are periodically arranged, each modulation unit comprises a plurality of pixels that are arranged in a row or in a column, the plurality of pixels are configured to respectively perform diffraction of a plurality of diffraction orders on incident light received, so that exit light is distributed in the plurality of areas of diffraction orders;
   collecting an image of human eye, determining the eye position according to the image of human eye, and determining an area of a target diffraction order corresponding to an eye position in the plurality of areas of diffraction orders;
   determining window hologram information of a diffraction window corresponding to the area of the target diffraction order based on an input image;
   controlling the plurality of pixels in the spatial light modulator to encode the window hologram information based on Burckhardt encoding mode; and
   controlling the spatial light modulator to generate light distributed in the area of the target diffraction based on the encoded window hologram information and the incident light, to achieve display in the area of the target diffraction order,
   wherein the determining window hologram information of a diffraction window corresponding to the area of the target diffraction order based on an input image comprises:
   when the area of target diffraction order corresponding to the eye position is an area of $1^{st}$ diffraction order, holographic complex amplitudes corresponding to a window of $1^{st}$ diffraction order are directly calculated to obtain the window hologram information;
   when the area of target diffraction order corresponding to the eye position is an area of $-1^{st}$ diffraction order, holographic complex amplitudes corresponding to a window of $1^{st}$ diffraction order are conjugated to obtain the window hologram information;
   when the area of target diffraction order corresponding to the eye position is an area of $2^{nd}$ diffraction order, holographic complex amplitudes corresponding to a window of $1^{st}$ diffraction order are calculated by halving phases of the holographic complex amplitudes to obtain the window hologram information; and
   when the area of target diffraction order corresponding to the eye position is an area of $-2^{nd}$ diffraction order, holographic complex amplitudes corresponding to a window of $1^{st}$ diffraction order are calculated by halving phases of the holographic complex amplitudes to obtain the window hologram information.

2. A holographic display device comprising a spatial light modulator, an eye position acquiring unit and a controller, wherein
   the spatial light modulator comprises a plurality of modulation units that are periodically arranged, each modulation unit comprises a plurality of pixels that are arranged in a row or in a column, the plurality of pixels are configured to respectively perform diffraction of a plurality of diffraction orders on incident light received, so that exit light is distributed in the plurality of areas of diffraction orders;
   the eye position acquiring unit is configured to acquire an eye position, determine an area of a target diffraction order corresponding to the eye position, and transmit the eye position to the controller;
   the controller comprises a memory storing instructions and at least one processor, when the instructions are executed by the at least one processor, the at least one processor being configured to:
     determine window hologram information of a diffraction window corresponding to the area of the target diffraction order based on an input image;
     control the plurality of pixels in the spatial light modulator to encode the window hologram information based on Burckhardt encoding mode; and wherein the spatial light modulator is configured to generate light distributed in the area of the target diffraction based on the encoded window hologram information and the incident light, to achieve display in the area of the target diffraction order; and wherein the at least one processor is further configured to:

calculate holographic complex amplitudes corresponding to a window of $1^{st}$ diffraction order directly to obtain the window hologram information when the area of the target diffraction order corresponding to the eye position is an area of $1^{st}$ diffraction order;

conjugate holographic complex amplitudes corresponding to a window of $1^{st}$ diffraction order to obtain the window hologram information when the area of the target diffraction order corresponding to the eye position is an area of $-1^{st}$ diffraction order;

halve phases of holographic complex amplitudes corresponding to a window of $1^{st}$ diffraction order to obtain the window hologram information when the area of the target diffraction order corresponding to the eye position is an area of $2^{nd}$ diffraction order; and conjugate holographic complex amplitudes corresponding to a window of $1^{st}$ diffraction order and halve phases of the holographic complex amplitudes to obtain the window hologram information when the area of the target diffraction order corresponding to the eye position is an area of $-2^{nd}$ diffraction order.

3. The holographic display device according to claim 2, wherein the eye position acquiring unit is an eyeball tracking device or an eye gaze tracking device adjacent to the spatial light modulator, the eyeball tracking device or the eye gaze tracking device being configured to collect an image of human eye and determine the eye position according to the image of human eye.

4. A holographic display device comprising a spatial light modulator, an eye position acquiring unit, a calculating unit and a processing unit, wherein the spatial light modulator comprises a plurality of modulation units that are periodically arranged, each modulation unit comprises a plurality of pixels that are arranged in a row or in a column, the plurality of pixels are configured to respectively perform diffraction of a plurality of diffraction orders on incident light received, so that exit light is distributed in the plurality of areas of diffraction orders;

the eye position acquiring unit is configured to acquire an eye position, determine an area of a target diffraction order corresponding to the eye position, and transmit the eye position to the calculating unit;

the calculating unit is configured to determine window hologram information of a diffraction window corresponding to the area of the target diffraction order based on an input image;

the processing unit is connected to the calculating unit and configured to encode the window hologram information by Burckhardt encoding mode and transmit the encoded window hologram information to the spatial light modulator; and wherein the spatial light modulator is configured to generate light distributed in the area of the target diffraction based on the encoded window hologram information and the incident light, to achieve display in the area of the target diffraction order; and wherein the calculating unit is further configured to:

calculate holographic complex amplitudes corresponding to a window of $1^{st}$ diffraction order directly to obtain the window hologram information when the area of the target diffraction order corresponding to the eye position is an area of $1^{st}$ diffraction order;

conjugate holographic complex amplitudes corresponding to a window of $1^{st}$ diffraction order to obtain the window hologram information when the area of the target diffraction order corresponding to the eye position is an area of $-1^{st}$ diffraction order;

halve phases of holographic complex amplitudes corresponding to a window of $1^{st}$ diffraction order to obtain the window hologram information when the area of the target diffraction order corresponding to the eye position is an area of $2^{nd}$ diffraction order; and conjugate holographic complex amplitudes corresponding to a window of $1^{st}$ diffraction order and halve phases of the holographic complex amplitudes to obtain the window hologram information when the area of the target diffraction order corresponding to the eye position is an area of $-2^{nd}$ diffraction order.

* * * * *

UNITED STATES PATENT AND TRADEMARK OFFICE
CERTIFICATE OF CORRECTION

| | | |
|---|---|---|
| PATENT NO. | : 11,378,916 B2 | Page 1 of 1 |
| APPLICATION NO. | : 16/332327 | |
| DATED | : July 5, 2022 | |
| INVENTOR(S) | : Bingchuan Shi | |

It is certified that error appears in the above-identified patent and that said Letters Patent is hereby corrected as shown below:

On the Title Page

Please delete Item (60)

Signed and Sealed this
Tenth Day of September, 2024

Katherine Kelly Vidal
*Director of the United States Patent and Trademark Office*